United States Patent Office 3,370,966
Patented Feb. 27, 1968

3,370,966
GLASS CEMENTS
James W. Schwartz, Western Springs, and Charles J. Prazak, Elmhurst, Ill., assignors to National Video Corporation, Chicago, Ill., a corporation of Illinois
No Drawing. Filed Jan. 31, 1964, Ser. No. 341,757
3 Claims. (Cl. 106—49)

ABSTRACT OF THE DISCLOSURE

Solder glass for forming a joint between two glass parts in which the solder glass is applied as a pasty mix and the assembly raised to fusion temperature. The solder glass includes a minor fraction by weight of an oxidizing agent which is so characterized that oxygen is released at a temperature in the fusion range to combine with metallic elements in the region of the joint and to oxidize organic matter occluded in the joint.

---

This invention relates to improvements in finely powdered glass, sometimes termed "frit," which when held in suspension in a suitable vehicle of low viscosity, may be applied to adjoining surfaces of glass articles to be joined and then fused to the surfaces to form a joint therebetween. A typical glass for the stated purpose is of the lead-zinc-borate type, with varying proportions of other ingredients. U.S. Patent No. 2,889,952 contains a table showing some acceptable formulations.

A cement as thus constituted finds great utility in connection with the manufacture of cathode ray tubes. For example, in the case of such tubes as presently used in color television based on the shadow mask system, the peripherally flanged face plate provided with the fluorescent screen and the adjacent, perforate color mask mounted on the flange are fabricated as an entirety and then united with the funnel. The adjoining edges of the face plate and funnel are ground flat, following which the funnel is supported with its open front end facing upwardly whereafter the powdered glass suspended in the vehicle is deposited as a bead of paste on the edge thereof by extrusion through a suitable nozzle. The face plate is then carefully positioned on the cement which, by reason of its weight, will cause the same to spread over the adjoining edges of the flange and funnel to insure that the same are fully covered. While the two parts of the tube so arranged are suitably supported, the assembly is passed through a lehr to subject it to a specified time-temperature relationship to devitrify the powdered glass and to drive off the organic components of the vehicle. It is understood in this art that the materials employed as a binder and vehicle, e.g. amyl acetate, should be capable of completely burning out or volatilizing well below the sealing temperature of glass. The end result is a gas-tight joint of adequate mechanical strength provided that provision is made to avoid the deleterious effects of a reducing atmosphere and of foreign matter.

Amplifying further, it is found that when the envelope, including the cement, is exposed to a reducing atmosphere at the elevated temperature of the lehr, the lead oxide (PbO) forming the largest percentage of the powdered glass, e.g., in the range of approximately 70% to 80%, loses some of its oxygen to yield free lead. Not only is lead a conductor whereby the dielectric strength of the glass is decreased but, being porous and of extremely low strength, it also alters the mechanical strength of the cement. Cemented joints thus affected are subject to voltage breakdown. Moreover, during the steps of cleaning the adjoining edges of the face plate flange and funnel, applying the cement and locating the parts, lint, metal particles and other adulterants may be introduced. If not neutralized or eliminated these will also affect the desired electrical and mechanical integrity of the bond.

In view of the foregoing, the principal object of this invention is to incorporate with the powdered glass a compound which, within the range of temperature to which the joint is subjected to form the seal, will readily decompose to yield free oxygen whereby to burn out the several adulterants usually encountered and which will combine with any metallic lead resulting from decomposition of the lead-containing components of the frit or of the glass comprising the parts being joined. It is possible that other metallic compounds of the powdered glass or of the parts being united may also decompose to yield the metal and, to such extent, the oxidizing ingredient contemplated by the present disclosure will tend to neutralize the deleterious effects thereof. In the case of metallic particles becoming entrapped in the cement the same will, upon oxidation, form the oxide which is an electrical insulator rather than a conductor. For example, metallic aluminum will be oxidized to aluminum oxide ($Al_2O_3$).

In order to provide an oxidizing agent which is effective to accomplish the results pointed out above, four important considerations present themselves; one, the agent should be compatible in density in order not to settle out in the pastry mix; two, the agent should decompose to provide free oxygen within the range of sealing temperatures; three, any product of oxidation should be chemically compatible with the several ingredients of the powered glass; and four, such product should not affect the mechanical strength of the seal.

Viewed in accordance with these desiderata, lead dioxide ($PbO_2$) has been found entirely suitable. Its density is 9.375 grams per milliliter at 20° C. referred to water at 4° C. while that of lead mono-oxide (PbO) is 0.53. Lead dioxide decomposes at 290° C. as compared to a maximum lehr temperature of from 350° to 450° C., thus yielding PbO.

One commercially available and widely used powdered glass capable of use in providing a seal between the face plate and funnel of a cathode ray tube contains PbO in an approximate amounts from 70% to 80% by weight of the powdered glass. It has been found that $PbO_2$ added to the exemplificative cement in the amount of 0.1% of the weight thereof satisfies the several desiderata referred to above. Variations in such proportion are possible, ranging from about 0.05% to 0.2%.

Inasmuch as PbO is the major ingredient of powdered glasses employed as seals, the reduction of $PbO_2$ to yield oxygen as a clarifying agent in the range indicated, simply adds infinitesimally to the proportion of PbO already present. Thus, the chemical and mechanical properties of the seal remain essentially unaffected. If more than the optimum quantity of $PbO_2$ is added, oxygen is released at an excessive rate and bubbling occurs. Obviously the resulting creation of porosities can not only lead to leakage through the seal but will adversely affect its mechanical strength.

Among other oxidizing compounds satisfying the criteria set forth above are: arsenic pentaoxide ($As_2O_5$), decomposing at 315° C.; potassium permanganate ($KMnO_4$), decomposing at about 240° C.; sodium peroxide ($Na_2O_2$), decomposing at 460° C.; chromium dioxide ($CrO_2$), decomposing at 300° C.; sodium hyponitrite ($Na_2N_2O_2$), decomposing at 300° C.; potassium nitrate ($KNO_3$), decomposing at 400° C.; ammonium nitrate ($NH_4NO_3$), decomposing at 210° C.

While we have shown certain embodiments of our invention, it will be understood, of course, that we do not wish to be limited thereto since many modifications may

We claim:

1. Lead-zinc-borate glass in powdered form for use as a sealing agent and lead dioxide in a percentage by weight of from about 0.05% to 0.2% of said glass.

2. Glass cement in powdered form to be blended with a fluid vehicle into paste form to seal two surfaces by fusion comprising a lead-zinc-borate glass including lead oxide in a percentage by weight of said glass of from about 70% to 80%, to which has been added lead dioxide in a percentage by weight of from about 0.05% to 0.2% of said glass.

3. Cement for joining two glass surfaces by fusion comprising a mixture of comminuted lead-zinc-borate glass including lead oxide in a percentage by weight of from about 70% to 80%, lead dioxide in a percentage by weight of from about 0.05% to 0.2% of the comminuted glass and a fluid vehicle in such proportion as to render the mixture sufficiently viscous as to remain in situ pending fusion.

References Cited

UNITED STATES PATENTS

| | | | |
|---|---|---|---|
| 2,557,545 | 6/1951 | Kerridge | 106—49 |
| 2,786,307 | 3/1957 | Pither | 65—59 |
| 2,898,395 | 8/1959 | Schurecht | 106—53 |

FOREIGN PATENTS 634,548   3/1950   Great Britain.

HELEN M. McCARTHY, *Primary Examiner.*

UNITED STATES PATENT OFFICE

CERTIFICATE OF CORRECTION

Patent No. 3,370,966　　　　　　　　　　　　February 27, 1968

James W. Schwartz et al.

It is hereby certified that error appears in the above numbered patent requiring correction and that the said Letters Patent should read as corrected below.

Column 2, line 37, for "0.53" read -- 9.53 --; line 43, for "amounts" read -- amount --.

Signed and sealed this 29th day of April 1969.

(SEAL)
Attest:

Edward M. Fletcher, Jr.　　　　　　　　　　　　EDWARD J. BRENNER
Attesting Officer　　　　　　　　　　　　　　　Commissioner of Patents